United States Patent
Adur et al.

(10) Patent No.: US 10,800,919 B2
(45) Date of Patent: Oct. 13, 2020

(54) MODIFICATION OF ENGINEERING PLASTICS USING OLEFIN-MALEIC ANHYDRIDE COPOLYMERS

(71) Applicant: Vertellus Holdings LLC, Indianapolis, IN (US)

(72) Inventors: Ashok M. Adur, Parsippany, NJ (US); Prasad Taranekar, Hopatcong, NJ (US)

(73) Assignee: Vertellus Holdings LLC, Indianapolis, IN (US)

( * ) Notice: Subject to any disclaimer, the term of this patent is extended or adjusted under 35 U.S.C. 154(b) by 0 days.

(21) Appl. No.: 15/326,307

(22) PCT Filed: Jul. 13, 2015

(86) PCT No.: PCT/US2015/040136
§ 371 (c)(1),
(2) Date: Jan. 13, 2017

(87) PCT Pub. No.: WO2016/010893
PCT Pub. Date: Jan. 21, 2016

(65) Prior Publication Data
US 2017/0204264 A1  Jul. 20, 2017

Related U.S. Application Data

(60) Provisional application No. 62/189,503, filed on Jul. 7, 2015, provisional application No. 62/024,174, filed on Jul. 14, 2014.

(51) Int. Cl.
| | |
|---|---|
| *C08L 77/02* | (2006.01) |
| *C08L 33/20* | (2006.01) |
| *C08L 59/02* | (2006.01) |
| *C08L 101/00* | (2006.01) |
| *C08L 55/02* | (2006.01) |
| *C08L 67/02* | (2006.01) |
| *C08L 67/04* | (2006.01) |
| *C08L 69/00* | (2006.01) |
| *C08L 75/06* | (2006.01) |

(52) U.S. Cl.
CPC .............. *C08L 77/02* (2013.01); *C08L 33/20* (2013.01); *C08L 55/02* (2013.01); *C08L 59/02* (2013.01); *C08L 67/02* (2013.01); *C08L 67/04* (2013.01); *C08L 69/00* (2013.01); *C08L 75/06* (2013.01); *C08L 101/00* (2013.01); *C08L 2205/03* (2013.01)

(58) Field of Classification Search
CPC ........ C08L 77/02; C08L 101/00; C08L 75/06; C08L 69/00; C08L 69/04; C08L 67/02; C08L 55/02; C08L 59/02; C08L 33/20; C08L 2205/03
See application file for complete search history.

(56) References Cited

U.S. PATENT DOCUMENTS

| | | | |
|---|---|---|---|
| 8,084,550 B2 | 12/2011 | Ellington et al. | |
| 2003/0216508 A1 | 11/2003 | Lee | |
| 2003/0225201 A1 | 12/2003 | Yamana et al. | |
| 2007/0154697 A1 | 7/2007 | Cossement et al. | |
| 2012/0108701 A1 | 5/2012 | Lim et al. | |
| 2012/0108729 A1* | 5/2012 | Lyons | C08L 67/02 524/451 |
| 2012/0122612 A1 | 5/2012 | Rajagopalan et al. | |
| 2013/0150517 A1 | 6/2013 | Tarbit et al. | |
| 2013/0298427 A1* | 11/2013 | Kaushik | A43B 5/04 36/117.1 |

FOREIGN PATENT DOCUMENTS

| | | |
|---|---|---|
| CA | 2878165 | 1/2014 |
| CN | 103709663 | 4/2014 |
| EP | 0837097 | 4/1998 |
| WO | WO 2014/008330 | 1/2014 |

OTHER PUBLICATIONS

Trivedi, B.C., et al.; Maleic Anhydride, 1982, p. 307-458.*
Johnson, D.W.; New Applications for Poly(ethylene-alt-maleic anhydride), 2010, p. i-244.*
Supplementary European Search Report Issued in EP 15822376, completed Mar. 7, 2018.
Search Report and Written Opinion issued in Singapore patent application 11201700305V, dated Jun. 25, 2018.
PCT Search Report and Written Opinion for PCT/US2015/040136, completed Oct. 19, 2015.

* cited by examiner

*Primary Examiner* — Robert S Jones
(74) *Attorney, Agent, or Firm* — Barnes & Thornburg LLP

(57) ABSTRACT

The present disclosure relates to novel compositions formed by compounding olefin-maleic anhydride copolymers (OMAP) such as ethylene-maleic anhydride copolymers with polyester (PE), polycarbonate (PC), polyacetal, thermoplastic urethane (TPU) and other engineering plastics.

12 Claims, No Drawings

MODIFICATION OF ENGINEERING PLASTICS USING OLEFIN-MALEIC ANHYDRIDE COPOLYMERS

CROSS-REFERENCE TO RELATED APPLICATIONS

This application is a national stage entry made under 35 U.S.C. § 371 (b) of PCT International Application No. PCT/US2015/040136, filed Jul. 13, 2015, which claims priority under 35 U.S.C. § 119(e) to U.S. Provisional Application Ser. No. 62/189,503, filed Jul. 7, 2015 and U.S. Provisional Application Ser. No. 62/024,174, filed Jul. 14, 2014; the entire disclosures of which are incorporated herein by reference.

FIELD

Methods of forming polyester, polycarbonate, polyacetal, thermoplastic urethane and other engineering plastic (EP) compositions having superior mechanical properties by reacting the polyester, polycarbonate, polyacetal, thermoplastic urethane and other engineering plastic with an olefin-maleic anhydride copolymer during compounding are described. Also described herein are novel compositions formed by compounding olefin-maleic anhydride copolymers (OMAP) such as ethylene-maleic anhydride copolymers with polyester (PE), polycarbonate (PC), polyacetal, thermoplastic urethane (TPU) and other engineering plastics.

BACKGROUND

Engineering plastics include plastic materials having superior mechanical and/or thermal properties compared to commodity plastics, such as polystyrene, PVC, polypropylene, polyethylene, and the like. Engineering plastics often refers to thermoplastic materials, and include a wide range of materials such as acrylonitrile butadiene styrene (ABS), used for car bumpers, dashboard trim and Lego® bricks; polycarbonates, used in motorcycle helmets; and polyamides (nylons), used for skis and ski boots. Engineering plastics have gradually replaced traditional engineering materials such as wood or metal in many applications. Besides equaling or surpassing wood and metal products in weight/strength and other properties, engineering plastics are much easier to manufacture, especially in complicated shapes. Engineering plastics often possess a unique combination of properties that may make it the material of choice for a particular application. For example, polycarbonates are highly resistant to impact, while polyamides are highly resistant to abrasion. Other properties exhibited by various grades of engineering plastics include heat resistance, mechanical strength, rigidity, chemical stability and fire resistance. As a result of the high degree of variability and wide applicability of their use, engineering plastics have been the subject of much research as development.

Despite large investments in engineering plastics that have been made to-date, there is a great need for the development of engineering plastics having superior properties.

SUMMARY

In some embodiments, the present disclosure provides a thermoplastic pelletizable polymer composition comprising (a) a polymer selected from the group consisting of a engineering plastic and an engineering plastic alloy; and (b) an olefin-maleic anhydride copolymer; wherein the polymer and the olefin-maleic anhydride copolymer are compounded.

In some embodiments, the present disclosure provides a thermoplastic pelletizable engineering plastic alloy composition comprising:

(a) an alloy of two or more engineering plastics, and (b) an olefin-maleic anhydride copolymer, wherein the thermoplastic pelletizable engineering plastic alloy composition has increased tensile strength, improved stretch performance, increased impact strength, increased flex modulus, increased heat deflection temperature, or a combination thereof compared to the unmodified alloy.

In some embodiments, the present disclosure provides a thermoplastic pelletizable engineering plastic alloy composition comprising:

(a) an alloy of two or more engineering plastics, and (b) an olefin-maleic anhydride copolymer.

In some embodiments, the present disclosure provides a thermoplastic pelletizable compatibilized polymer alloy composition comprising:

(a) two or more different engineering plastics, where at least two of the engineering plastics are non-compatible; and (b) an olefin-maleic anhydride copolymer, wherein the olefin-maleic anhydride copolymer (OMAP) enables the compatibilization of the engineering plastics.

In some embodiments, the present disclosure provides a compounded polyester produced by a process comprising the step of compounding a polymer mixture at a processing temperature, where the polymer mixture comprises polyester and an olefin-maleic anhydride copolymer.

In some embodiments, the disclosure provides a method for preparing a compounded polyester comprising the step of compounding a polymer mixture at a processing temperature, where the polymer mixture comprises a polyester, an olefin-maleic anhydride copolymer, and optionally a stabilizing agent.

Additional embodiments, features, and advantages of the disclosure will be apparent from the following detailed description and through practice of the disclosure. The polymers of the present disclosure can be described as embodiments in any of the following enumerated clauses. It will be understood that any of the embodiments described herein can be used in connection with any other embodiments described herein to the extent that the embodiments do not contradict one another.

1. A thermoplastic pelletizable polymer composition comprising:

(a) a polymer selected from the group consisting of an engineering plastic and an engineering plastic alloy; and (b) an olefin-maleic anhydride copolymer; wherein the polymer and the olefin-maleic anhydride copolymer are compounded.

2. The thermoplastic pelletizable polymer composition of clause 1, wherein the polymer is an engineering plastic.

3. The thermoplastic pelletizable polymer composition of clause 1 or 2, wherein the polymer is selected from the group consisting of polyoxymethylene (POM), polycarbonate (PC), thermoplastic polyurethane (TPU) and acrylonitrile-butadiene-styrene terpolymers (ABS).

4. The thermoplastic pelletizable polymer composition of clause 1 or 2, wherein the engineering plastic is a polyester.

5. The thermoplastic pelletizable polymer composition of clause 1, 2 or 4, wherein the polymer is selected from the group consisting of a polylactic acid (PLA), a polyglycolic acid (PGA), a polycaprolactone (PCL), a polyethylene adipate (PEA), a polyhydroxyalkanoate (PHA), a polyhydroxybutyrate (PHB), a poly(3-hydroxybutyrate-co-3-hydroxyvalerate) (PHBV), a polyethylene terephthalate (PET), a polybutylene terephthalate (PBT), a polytrimethylene terephthalate (PTT), a polyethylene naphthalate (PEN), an aromatic liquid crystal polyester (LCP) polyester, a copolyester of polyethylene terephthalate, a copolyester of polyethylene naphthalate, a copolyester of polyethylene isophthalate and a copolyester of polybutylene terephthalate.

6. The thermoplastic pelletizable polymer composition of clause 1, 2, 4 or 5, wherein the polymer is selected from the group consisting of a polyhydroxyalkanoate, a polylactic acid, a polyethylene terephthalate and a polybutylene terephthalate.

7. The thermoplastic pelletizable polymer composition of clause 1, wherein the polymer is an engineering plastic alloy.

8. The thermoplastic pelletizable polymer composition of clause 1 or 7, wherein the engineering plastic alloy is a polyester alloy.

9. The thermoplastic pelletizable polymer composition of clause 8, wherein the polyester alloy is an alloy of a polyethylene terephthalate (PET) and a polybutylene terephthalate (PBT).

10. The thermoplastic pelletizable polymer composition of clause 1 or 7, wherein the engineering plastic alloy comprises two or more of polyoxymethylene (POM), polycarbonate (PC), thermoplastic polyurethane (TPU) or acrylonitrile-butadiene-styrene terpolymer (ABS).

11. The thermoplastic pelletizable polymer composition of clause 10, wherein the engineering plastic alloy is an alloy of polycarbonate and acrylonitrile-butadiene-styrene terpolymer (ABS).

12. The thermoplastic pelletizable polymer composition of clause 1 or 7, wherein the engineering plastic alloy comprises a first polymer selected from the group consisting of polyoxymethylene (POM), polyamide, polycarbonate (PC), thermoplastic polyurethane (TPU) or acrylonitrile-butadiene-styrene terpolymer (ABS), and a second polymer selected from the group consisting of a polylactic acid (PLA), a polyglycolic acid (PGA), a polycaprolactone (PCL), a polyethylene adipate (PEA), a polyhydroxyalkanoate (PHA), a polyhydroxybutyrate (PHB), a poly(3-hydroxybutyrate-co-3-hydroxyvalerate) (PHBV), a polyethylene terephthalate (PET), a polybutylene terephthalate (PBT), a polytrimethylene terephthalate (PTT), a polyethylene naphthalate (PEN), an aromatic liquid crystal polyester (LCP) polyester, a copolyester of polyethylene terephthalate, a copolyester of polyethylene naphthalate, a copolyester of polyethylene isophthalate and a copolyester of polybutylene terephthalate.

13. The thermoplastic pelletizable polymer composition of clause 12, wherein the engineering plastic alloy comprises thermoplastic polyurethane (TPU) and polybutylene terephthalate (PBT).

14. The thermoplastic pelletizable polymer composition of clause 12, wherein the engineering plastic alloy comprises a polyamide and polybutylene terephthalate (PBT).

15. The thermoplastic pelletizable polymer composition of any one of the preceding clauses, wherein the polymer further comprises a glass fiber.

16. The thermoplastic pelletizable polymer composition of any one of the preceding clauses, wherein the polymer comprises a recycled polymer.

17. The thermoplastic pelletizable polymer composition of any one of the preceding clauses, wherein the olefin-maleic anhydride copolymer is a copolymer of maleic anhydride and an olefin selected from the group consisting of ethylene, propylene, isobutylene, 1-butene, octene, butadiene, styrene, isoprene, hexene, dodecene, 1-dodecene and tetradecene.

18. The thermoplastic pelletizable polymer composition of any one of the preceding clauses, wherein the olefin-maleic anhydride copolymer is a copolymer of maleic anhydride and ethylene.

19. The thermoplastic pelletizable polymer composition of any one of the preceding clauses, wherein the olefin-maleic anhydride copolymer has a molar ratio of ethylene to maleic anhydride range of about 1:10 to about 10:1.

20. The thermoplastic pelletizable polymer composition of any one of the preceding clauses, wherein the olefin-maleic anhydride copolymer is a 1:1 alternating copolymer of maleic anhydride and an olefin selected from the group consisting of ethylene, propylene, isobutylene, 1-butene, octene, butadiene, styrene, isoprene, hexene, dodecene, 1-dodecene and tetradecene.

21. A method for preparing a compounded polyester comprising:
the step of compounding a polymer mixture at a processing temperature, where the polymer mixture comprises a polyester, an olefin-maleic anhydride copolymer, and optionally a stabilizing agent.

22. The method of clause 21, wherein the olefin-maleic anhydride copolymer is a copolymer of maleic anhydride and an olefin selected from the group consisting of ethylene, propylene, isobutylene, 1-butene, octene, butadiene, styrene, isoprene, hexene, dodecene, 1-dodecene and tetradecene.

23. The method of clause 21 or 22, wherein the olefin-maleic anhydride copolymer is a copolymer of maleic anhydride and ethylene.

24. The method of any one of clauses 21 to 23, wherein the olefin-maleic anhydride copolymer is a 1:1 alternating copolymer of maleic anhydride and an olefin selected from the group consisting of ethylene, propylene, isobutylene, 1-butene, octene, butadiene, styrene, isoprene, hexene, dodecene, 1-dodecene and tetradecene.

25. The method of any one of clauses 21 to 24, wherein the polyester is selected from the group consisting of a polylactic acid (PLA), a polyglycolic acid (PGA), a polycaprolactone (PCL), a polyethylene adipate (PEA), a polyhydroxyalkanoate (PHA), a polyhydroxybutyrate (PHB), and a poly(3-hydroxybutyrate-co-3-hydroxyvalerate) (PHBV), a polyethylene terephthalate (PET), a polybutylene terephthalate (PBT), a polytrimethylene terephthalate (PTT), a polyethylene naphthalate (PEN), an aromatic liquid crystal polyester (LCP), a copolyester of polyethylene terephthalate, a copolyester of polyethylene naphthalate, a copolyester of polyethylene isophthalate, a copolyester of polybutylene terephthalate, and combinations thereof.

26. The method of any one of clauses 21 to 25, wherein the polyester is selected from the group consisting of a polyhydroxyalkanoate, a polylactic acid, a polyethylene terephthalate, a polybutylene terephthalate, and mixtures thereof.

27. The method of any one of clauses 21 to 25, wherein the polyester is a mixture of a polyethylene terephthalate (PET) and a polybutylene terephthalate (PBT).

28. The method of any one of clauses 21 to 27, wherein the olefin-maleic anhydride copolymer has a weight average molecular weight ($MW_w$) of about 300 to 1,000,000.

29. The method of any one of clauses 21 to 28, wherein the olefin-maleic anhydride copolymer has a concentration of about 0.01% to about 0.5%, about 0.5% to about 1.0%, about 1.0% to about 1.5%, or 1.5% to about 3.0% w/w.

30. The method of any one of clauses 21 to 29, wherein the processing temperature is about 180° C. to about 325° C.

31. The method of any one of clauses 21 to 30, wherein the polymer mixture further comprises a glass fiber.

32. The method of any one of clauses 21 to 31, wherein the glass fiber has a concentration of about 0.1% to about 50%

33. The method of any one of clauses 21 to 32, wherein the polymer mixture further comprises one or more stabilizing agents.

34. The method of clause 33, wherein each of the one or more stabilizing agents independently has a concentration of about 0.01 to about 1.0% w/w.

35. A compounded polyester produced by a process comprising the step of compounding a polymer mixture at a processing temperature, where the polymer mixture comprises polyester and an olefin-maleic anhydride copolymer.

36. The compounded polyester of clause 35, wherein the olefin-maleic anhydride copolymer has a ratio of olefin to maleic anhydride of 1:1.

37. The compounded polyester of clause 35 or 36, wherein the olefin-maleic anhydride copolymer has a weight average molecular weight ($MW_w$) of about 1000 to 900,000.

38. The compounded polyester of any one of clauses 35 to 37, wherein the olefin-maleic anhydride copolymer has a concentration of about 0.01% to about 0.5%, about 0.5% to about 1.0%, about 1.0% to about 1.5%, or 1.5% to about 3.0% w/w.

39. The compounded polyester of any one of clauses 35 to 38, wherein the olefin-maleic anhydride copolymer is an ethylene-maleic anhydride copolymer.

40. The compounded polyester of clause 35 or 39, wherein the polyester is selected from the group consisting of a polylactic acid (PLA), a polyglycolic acid (PGA), a polycaprolactone (PCL), a polyethylene adipate (PEA), a polyhydroxyalkanoate (PHA), a polyhydroxybutyrate (PHB), a poly(3-hydroxybutyrate-co-3-hydroxyvalerate) (PHBV), a polyethylene terephthalate (PET), a polybutylene terephthalate (PBT), a polytrimethylene terephthalate (PTT), a polyethylene naphthalate (PEN), an aromatic liquid crystal polyester (LCP) polyester, copolyesters of polyethylene terephthalate, copolyesters of polyethylene naphthalate, copolyesters of polyethylene isophthalate, copolyesters of polybutylene terephthalate, and combinations thereof.

41. The compounded polyester of any one of clauses 35 to 40, wherein the polyester is selected from the group consisting of a polyhydroxyalkanoate, a polylactic acid, a polyethylene terephthalate, a polybutylene terephthalate, and mixtures thereof.

42. The compounded polyester of any one of clauses 35 to 40, wherein the polyester is mixture of a polyethylene terephthalate (PET) and a polybutylene terephthalate (PBT).

43. The compounded polyester of any one of clauses 35 to 42, wherein the processing temperature is from about 180° C. to about 325° C.

44. The compounded polyester of any one of clauses 35 to 43, wherein the polymer mixture further comprises a glass fiber.

45. The compounded polyester of clause 44, wherein the glass fiber has a concentration of about 0.1% to about 30%.

46. The compounded polyester of any one of clauses 35 to 45, wherein the polymer mixture further comprises one or more additives.

47. The compounded polyester of clause 46, wherein the one or more additives is independently selected from an inter-esterification catalysts, an esterification catalysts, an etherification inhibitors, a polymerization catalysts, a heat stabilizers including heat stabilizers and, a light stabilizers, a polymerization regulators, a plasticizers, a lubricants, a rheology modifiers, a friction modifiers, an anti-blocking agent, an antioxidant, an antistatic agent, a UV absorber, a pigment, and a dye.

48. The compounded polyester of clause 46 or 47, wherein the one or more stabilizing agents each independently has a concentration of about 0.01% w/w to about 5.0% w/w.

49. The compounded polyester of any one of clauses 35 to 48, wherein the ethylene maleic anhydride copolymer has a weight average molecular weight ($MW_w$) of about 60,000 to about 400,000.

50. The compounded polyester of any one of clauses 35 to 49, wherein the polyester is recycled polyester.

51. A thermoplastic pelletizable engineering plastic alloy composition comprising:
(a) an alloy of two or more engineering plastics, and
(b) an olefin-maleic anhydride copolymer,
wherein the thermoplastic pelletizable engineering plastic alloy composition has increased tensile strength, improved stretch performance, increased impact strength, increased flex modulus, increased heat deflection temperature, or a combination thereof compared to the unmodified alloy.

52. The thermoplastic pelletizable engineering plastic alloy composition of clause 51, wherein the alloy of two or more engineering plastics comprises two or more polyesters.

53. The thermoplastic pelletizable engineering plastic alloy composition of clauses 51 or 52, wherein the alloy of two or more engineering plastics comprises polyesters independently selected from the group consisting of a polylactic acid (PLA), a polyglycolic acid (PGA), a polycaprolactone (PCL), a polyethylene adipate (PEA), a polyhydroxyalkanoate (PHA), a polyhydroxybutyrate (PHB), a poly(3-hydroxybutyrate-co-3-hydroxyvalerate) (PHBV), a polyethylene terephthalate (PET), a polybutylene terephthalate (PBT), a polytrimethylene terephthalate (PTT), a polyethylene naphthalate (PEN), an aromatic liquid crystal polyester (LCP) polyester, a copolyester of polyethylene terephthalate, a copolyester of polyethylene naphthalate, a copolyester of polyethylene isophthalate, and a copolyester of polybutylene terephthalate.

54. The thermoplastic pelletizable engineering plastic alloy composition of any one of clauses 51 to 53, wherein the two or more engineering plastics are polyethylene terephthalate (PET) and polybutylene terephthalate (PBT).

55. The thermoplastic pelletizable engineering plastic alloy composition of any one of clauses 51 or 54, wherein the olefin-maleic anhydride copolymer is an ethylene-maleic anhydride polymer.

56. The thermoplastic pelletizable engineering plastic alloy composition of clause 55, wherein the ethylene-maleic anhydride copolymer has a ratio of ethylene to maleic anhydride of 1:1.

57. The thermoplastic pelletizable engineering plastic alloy composition of clause 55 or 56, wherein the ethylene-maleic anhydride copolymer has a weight average molecular weight ($MW_w$) of about 1000 to 900,000.

58. The thermoplastic pelletizable engineering plastic alloy composition of any one of clauses 55 to 57, wherein the ethylene-maleic anhydride has a concentration of about 0.01% to about 0.5%, about 0.5% to about 1.0%, about 1.0% to about 1.5%, or 1.5% to about 3.0% w/w.

59. The thermoplastic pelletizable engineering plastic alloy composition of any one of clauses 51 to 58, wherein the thermoplastic pelletizable engineering plastic alloy composition is formed at a processing temperature of from about 180° C. to about 325° C.

60. The thermoplastic pelletizable engineering plastic alloy composition of any one of clauses 51 to 59, wherein the polymer mixture further comprises a glass fiber.

61. The thermoplastic pelletizable engineering plastic alloy composition of clause 50, wherein the glass fiber has a concentration of about 0.1% to about 30%.

62. The thermoplastic pelletizable engineering plastic alloy composition of any one of clauses 11 to 61, wherein the polymer mixture further comprises one or more additives.

63. The thermoplastic pelletizable engineering plastic alloy composition of clause 62, wherein the one or more additives are each independently selected from an inter-esterification catalyst, an esterification catalyst, an etherification inhibitor, a polymerization catalyst, a heat stabilizer, a light stabilizer, a polymerization regulator, a plasticizer, a lubricant, a rheology modifier, a friction modifier, an antiblocking agent, an antioxidant, an antistatic agent, a UV absorber, a pigment, a dye, and mixtures thereof.

64. The thermoplastic pelletizable engineering plastic alloy composition of any one of clauses 61 to 63, wherein the engineering plastic is recycled.

65. A thermoplastic pelletizable compatibilized polymer alloy composition comprising:
(a) two or more engineering plastics, wherein at least two of the engineering plastics are non-compatible engineering plastics; and
(b) an olefin-maleic anhydride copolymer,
wherein the olefin-maleic anhydride copolymer enables compatibilization of the non-compatible engineering plastics.

66. The thermoplastic pelletizable compatibilized polymer alloy composition of clause 65, wherein the engineering plastics are a first polymer selected from the group consisting of polyoxymethylene (POM), polyamide, polycarbonate (PC), thermoplastic polyurethane (TPU) or acrylonitrile-butadiene-styrene terpolymer (ABS), and a second polymer selected from the group consisting of a polylactic acid (PLA), a polyglycolic acid (PGA), a polycaprolactone (PCL), a polyethylene adipate (PEA), a polyhydroxyalkanoate (PHA), a polyhydroxybutyrate (PHB), a poly(3-hydroxybutyrate-co-3-hydroxyvalerate) (PHBV), a polyethylene terephthalate (PET), a polybutylene terephthalate (PBT), a polytrimethylene terephthalate (PTT), a polyethylene naphthalate (PEN), an aromatic liquid crystal polyester (LCP) polyester, a copolyester of polyethylene terephthalate, a copolyester of polyethylene naphthalate, a copolyester of polyethylene isophthalate and a copolyester of polybutylene terephthalate.

67. The thermoplastic pelletizable compatibilized polymer alloy composition of clause 65 or 66, wherein non-compatible engineering plastics are thermoplastic polyurethane (TPU) and polybutylene terephthalate (PBT).

68. The thermoplastic pelletizable compatibilized polymer alloy composition of clause 65 or 66, wherein the non-compatible engineering plastics are a polyamide and polybutylene terephthalate (PBT).

69. The thermoplastic pelletizable compatibilized polymer alloy composition of any one of clauses 65 to 68, wherein the olefin-maleic anhydride copolymer is an ethylene-maleic anhydride polymer.

70. The thermoplastic pelletizable compatible polymer alloyed composition of clause 69, wherein the ethylene-maleic anhydride copolymer has a ratio of ethylene to maleic anhydride of 1:1.

71. The thermoplastic pelletizable compatible polymer alloyed composition of clause 69 or 70, wherein the ethylene-maleic anhydride copolymer has a weight average molecular weight ($MW_w$) of about 1000 to 900,000.

72. The thermoplastic pelletizable compatibilized polymer alloy composition of any one of clauses 69 to 71, wherein the ethylene-maleic anhydride has a concentration of about 0.01% to about 0.5%, about 0.5% to about 1.0%, about 1.0% to about 1.5%, or 1.5% to about 3.0% w/w.

73. The thermoplastic pelletizable compatibilized polymer alloy composition of any one of the preceding clauses, wherein thermoplastic pelletizable compatibilized polymer alloy composition is formed by compounding at a processing temperature of from about 180° C. to about 325° C.

74. The thermoplastic pelletizable compatibilized polymer alloy composition of any one of clauses 65 to 73, wherein the two or more engineering plastics further comprises a glass fiber.

75. The thermoplastic pelletizable compatibilized polymer alloy composition of clause 74, wherein the glass fiber has a concentration of about 0.1% to about 30%.

76. The thermoplastic pelletizable compatibilized polymer alloy composition of any one of clauses 65 to 75, wherein the two or more engineering plastics further comprises one or more additives.

77. The thermoplastic pelletizable compatibilized polymer alloy composition of clause 76, wherein the one or more additives are each independently selected from an inter-esterification catalyst, an esterification catalyst, an etherification inhibitor, a polymerization catalyst, a heat stabilizer, a light stabilizer, a polymerization regulator, a plasticizer, a lubricant, a rheology modifier, a friction modifier, an antiblocking agent, an antioxidant, an antistatic agent, a UV absorber, a pigment, a dye, and mixtures thereof.

78. The thermoplastic pelletizable compatibilized polymer alloy composition of clause 76 or 77, wherein the one or more additives each independently has a concentration of about 0.01% w/w to about 5.0% w/w.

79. The thermoplastic pelletizable compatibilized polymer alloy composition of any one of clauses 65 to 75, wherein one or more of the engineering plastic is recycled.

80. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the olefin-maleic anhydride copolymer is in the form of a master batch composition comprising the olefin-maleic anhydride copolymer and one or more carrier resins.

81. The thermoplastic pelletizable polymer composition, method, compounded polyester, thermoplastic pelletizable engineering plastic alloy composition, or thermoplastic pelletizable compatibilized polymer alloy composition of the preceding clause wherein the master batch carrier resin is selected from polymers of polyacetal, polycarbonate, thermoplastic polyurethane (TPU), or acrylonitrile-butadiene-styrene terpolymers (ABS), or polyester such as polylactic acid (PLA), a polyglycolic acid (PGA), a polycaprolactone (PCL), a polyethylene adipate (PEA), a polyhydroxyalkanoate (PHA), a polyhydroxybutyrate (PHB), a poly(3-hydroxybutyrate-co-3-hydroxyvalerate) (PHBV), a polyethylene terephthalate (PET), a polybutylene terephthalate (PBT), a polytrimethylene terephthalate (PTT), ethyleneester copolymers; polyamides, polyamides wherein amine end groups of the polyamide are capped, or the end groups of the polyamide are carboxylic acid groups and not amines; polysulfonylamides, where the end groups of the polysulfonylamides are not amines; polycarbonates, where the end groups of the polycarbonate are carboxylic acid groups; and polyesters, where the end groups of the polyester are carboxylic acid groups, and combinations thereof.

82. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the master batch carrier resin is an ethylene-n-butyl acrylate copolymer, an ethylene-ethyl acrylate copolymer, an ethylene-methyl acrylate copolymer, or a combination thereof.

83. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the master batch carrier resin is an ethylene-methyl acrylate copolymer.

84. The thermoplastic pelletizable polymer composition, method, compounded polyester, thermoplastic pelletizable engineering plastic alloy composition, or thermoplastic pelletizable compatibilized polymer alloy composition of any one of clauses 1 or 2 wherein the master batch carrier resin is a polyamide.

85. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the master batch composition further comprises one or more additives independently selected in each instance from the group consisting of anti-oxidants, nucleating agents, colorants, plasticizers, lubricants, rheology modifiers, friction modifiers, flame retardants, fillers and reinforcements, other processing aids, and heat stabilizers for polyamides.

86. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the one or more additives in the master batch composition is independently selected in each instance from the group consisting of anti-oxidants and heat stabilizers for polyesters.

87. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the olefin-maleic anhydride copolymer in the master batch composition is a 1:1 olefin-maleic anhydride copolymer.

88. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the olefin-maleic anhydride copolymer in the master batch composition is a 1:1 ethylene-maleic anhydride copolymer.

89. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the olefin-maleic anhydride copolymer in the master batch composition is a 1:1 alternating copolymer.

90. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the olefin-maleic anhydride copolymer in the master batch composition has a weight average molecular weight ($MW_w$) of 1,000 to 800,000 Daltons.

91. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the olefin-maleic anhydride copolymer in the master batch composition has a weight average molecular weight ($MW_w$) of 50,000 to 500,000 Daltons.

92. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the olefin-maleic anhydride copolymer in the master batch composition has a weight average molecular weight ($MW_w$) of 60,000 Daltons.

93. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the olefin-maleic anhydride copolymer in the master batch composition has a weight average molecular weight ($MW_w$) of 400,000 Daltons.

94. The thermoplastic pelletizable polymer composition, method, compounded polyester, thermoplastic pelletizable engineering plastic alloy composition, or thermoplastic pelletizable compatibilized polymer alloy composition of any one of the preceding clauses wherein the olefin-maleic anhydride copolymer in the master batch composition has a concentration of from about 5% to about 50%, or from about 10% to about 40%, or from about 10% to about 35%, or from about 10% to about 30%, or from about 15% to about 25%.

95. An article produced by injection molding, blow molding, roto-forming, fiber forming, film, profile extrusion, sheet extrusion, thermoforming the thermoplastic pelletizable polymer composition, compounded polyester, thermoplastic pelletizable engineering plastic alloy composition, or thermoplastic pelletizable compatibilized polymer alloy composition of any one of the preceding clauses.

96. The article of the preceding clause wherein the thermoplastic pelletizable polymer composition, compounded polyester, thermoplastic pelletizable engineering plastic alloy composition, or thermoplastic pelletizable compatibilized polymer alloy composition is compounded during formation of the article.

DETAILED DESCRIPTION

Articles manufactured from those novel compositions are also described herein. It will be appreciated that products which are made from PE, PC and TPU are exposed to considerable stresses during manufacture and processing and eventual end use in the application, and that a composition and method for producing enhanced properties with increased durability are needed. The concept of enhancing performance of individual engineering plastics by compounding with olefin-maleic anhydride copolymers (OMAP) can be extended to compositions that comprise more than one type of engineering plastic, to form useful engineering plastic alloys. In compositions where existing alloys are compatible, the addition of olefin-maleic anhydride copolymers (OMAP) increases mechanical performance. In compositions, where incompatibility exists, the olefin-maleic anhydride copolymer (OMAP) enables the compatibilization of different engineering plastics.

The compositions described herein may be formed by providing an engineering plastic reaction mixture of an engineering plastic or an alloy of engineering plastics with an olefin-maleic anhydride copolymer, and compounding the engineering plastic reaction mixture at a processing temperature.

Described herein are novel compositions formed by compounding olefin-maleic anhydride copolymers, such as ethylene-maleic anhydride copolymers, with an engineering plastic or an alloy of engineering plastics. Compounding an engineering plastic or an alloy of engineering plastics with olefin-maleic anhydride copolymer enhances many properties of engineering plastics or alloy of engineering plastics.

Illustrative engineering plastics whose properties can be modified by compounding with olefin-maleic anhydride copolymers a polyester (PE), a terpolymer of acrylonitrile-butadiene-styrene (ABS), a polycarbonate, a polyphenylene ether (PPE), a polyacetal (also referred to as a polyoxymethylene or a polyformaldehyde), a polyamide (a nylon), a polyethylenterephthalate (PET), a polybutylenterephthalate (PBT), a polysulphone (PSU), a polyetherimide (PEI), a polyphenyl sulphone (PPSU), a polyether sulphone (PES), a polyphenylenesulphide (PPS), a polyaryletherketone (PAEK), a polyamidimide (PAI), a polyimides (PI) and combinations thereof.

In one embodiment, olefin-maleic anhydride copolymers can be used to modify the properties of polyesters. The polyesters can be synthetic or natural/bio-based or even thermoset (such as unsaturated polyester that is then cross-linked or cured with peroxide or by other methods). Illustrative examples of polyesters include but are not limited to aliphatic polyesters such as polylactic acid (PLA), polyglycolic acid (PGA), polycaprolactone (PCL), polyethylene adipate (PEA), polyhydroxyalkanoate (PHA), polyhydroxybutyrate (PHB), and poly(3-hydroxybutyrate-co-3-hydroxyvalerate) (PHBV). Additional illustrative examples of polyesters include semi-aromatic polyesters such as polyethylene terephthalate (PET), polybutylene terephthalate (PBT), polytrimethylene terephthalate (PTT), polyethylene naphthalate (PEN) and aromatic liquid crystal polyester (LCP) type polyesters such as Vectra®. Other examples of copolyesters included in the methods and compositions described hereinare PETG and commercial products like EcoFlex® from BASF, Triton® and Eastar® from Eastman Chemicals, and Polyclear® from Invista. It is to be understood that a single polyester or an alloy of one or more polyesters may be used in any of the polymers, methods, or compositions described herein.

In another embodiment, compounding with olefin-maleic anhydride copolymers upgrades recycled or virgin polyester chosen from one or more of the families described above. As used herein, the term "recycled" includes reprocessed, regrind, scrap and reclaimed polyester from a post-industrial process, a post-consumer source, or an "off-grade" product from a polyester manufacturer. As used herein, "upgrades" refers to improving the mechanical performance of a polyester relative to the unmodified polyester resin. For instance, an upgraded polyester could have increased tensile elongation or tensile modulus.

Condensation polymers such as polyesters are widely used to make plastic products such as films, bottles, and other molded products. The mechanical and physical properties of these polymers are dependent on their molecular weights. These materials may experience an extrusion step and a final processing step which may be another compounding/extrusion operation followed by profile or sheet forming, thermoforming, blow molding, or fiber spinning, or they can be injection or otherwise molded in the molten state. Typically, all of these steps occur under high temperature conditions and may cause some degree of polymer molecular weight degradation. This molecular weight degradation may occur via high temperature hydrolysis, alcoholysis or other de-polymerization mechanisms well known for these types of polyesters. It is known that molecular weight degradation can negatively affect the mechanical and rheological properties of polyesters. These property changes can limit or exclude the use of these materials in demanding applications or from being recycled.

In one embodiment, addition of olefin-maleic anhydride copolymers to polyesters increases the melt viscosity of the polyesters. It is believed that this increase in melt viscosity may arise via chain extension and/or branching. The olefin-maleic anhydride copolymers are used at levels that show low levels of branching promoting an increase in melt viscosity. The modified polyester with increased melt viscosity and branching is believed to exhibit a non-Newtonian flow which is particularly useful for certain applications, such as extrusion blow molding, roto-forming, fiber forming, film extrusion, profile extrusion, sheet extrusion and thermoforming.

In another embodiment the olefin-maleic anhydride copolymers are used in the form of concentrates dispersed in a suitable carrier resin along with additives. Such concentrates can be referred to as master batches.

In some embodiments, UV stabilizers and absorbents, halogenated or non-halogenated flame retardant additives; reinforcements such a mineral or fibers, fabrics, roving filaments, tubes and yarns, made from glass, carbon, graphite, cellulose and other natural materials; and/or aromatic high melting polymers (sometimes referred to as aramids) are included within the reaction mixture.

In some embodiments, inter-esterification catalysts, esterification catalysts, etherification inhibitors, polymerization catalysts, stabilizers including heat stabilizers and light stabilizers, polymerization regulators, plasticizers, lubricants, rheology modifiers, friction modifiers, an anti-blocking agent, an antioxidant, an antistatic agent, a UV absorber, a pigment, a dye and other additives or stabilizing agents known in the art may also be optionally added to the mixtures described herein.

In some embodiments, the olefin-maleic anhydride copolymers or its concentrate form are used optionally with other additives typically used in polymer and plastic compounds (thermoplastic and thermoset. Illustrative examples of additives include: fillers, reinforcements, flame retardants, antioxidants and stabilizers, and the like.

In some embodiment, addition of an olefin-maleic anhydride copolymer is used to alloy two or more polyesters improving the overall mechanical properties of the polyester-polyester alloy compound.

In some embodiments, the addition of an olefin-maleic anhydride copolymer is used to alloy polyesters with polyamides improving the overall mechanical properties of the polyester-polyamide alloy compound.

Although injection molding is the commonly applied process for the final conversion of the compositions described herein, it is appreciated that, in addition to the processes described herein, the compositions described herein are useful in other processes such as blow molding, roto-forming, fiber forming, film, profile and sheet extrusion and thermoforming.

Illustrative embodiments described herein include use of processing methods such as extrusion compounding using equipment known to one skilled in the art. In the plastics industry, compounding is a process that mixes one or more polymers with one or more additives to produce plastic compounds in one or more steps. The feeds may be pellets, powder and/or liquids, but the product is usually in pellet form, to be used in other plastic-forming processes such as extrusion and injection molding.

Other illustrative embodiments of the methods described herein include directly extruding the compounding mixture into a finished article such as a filament, fiber, film, sheet, and molded part. It is to be understood that the compounding step may include a reaction between one and more of the components of the mixture.

In any of the methods or compositions described herein, one or more UV stabilizers, or UV absorbents, halogenated or non-halogenated flame retardant additives, reinforcements such a mineral or fibers, fabrics, roving filaments, tubes and yarns, made from glass, carbon, graphite, cellulose and other natural materials; and/or aromatic high melting polymers (sometimes referred to as aramids) are included. Plasticizers, lubricants, rheology modifiers, friction modifiers, and other additives known to one skilled in the art may also be optionally added. Additional illustrative additives include, heat stabilizers, light stabilizers, polymerization regulators, plasticizers, lubricants, rheology modifiers, friction modifiers, anti-blocking agents, antioxidants, antistatic agents, pigments, dyes, fillers or mixtures thereof.

In any of the methods or compositions described herein, the olefin-maleic anhydride can be an ethylene maleic anhydride alternating copolymer (EMA) with a molar ratio of ethylene to maleic anhydride of about 1:1. In any of the methods or compositions described herein, the olefin-maleic anhydride can an ethylene maleic anhydride alternating copolymer (EMA) with a molar ratio of ethylene to maleic anhydride of about 1:99 to about 99:1. In any of the methods or compositions described herein, the olefin-maleic anhydride copolymer can be an alternating copolymer, a non-alternating copolymer or a random copolymer with a molar ratio of ethylene to maleic anhydride range of about 1:50 to about 50:1; about 1:20 to about 20:1; about 1:10 to about 10:1; about 1:5 to about 5:1; and about 1:2 to about 2:1. The olefin-maleic anhydride copolymers used in the compositions and methods described herein distinctly differ from maleic anhydride grafted polyolefins. In maleic anhydride grafted polyolefins the molar ratio of the maleic anhydride to olefin is generally less than 1:100 and more typically less than 1:10,000. Illustrative differences between the olefin-maleic anhydride copolymers used herein and maleic anhydride grafted polyolefins are listed in the following table.

| Polyolefins Grafted with Maleic Anhydride | Alternating Olefin-Maleic anhydride Copolymers |
|---|---|
| Average number of maleic anhydride groups per molecular chain = 1 | Average number of maleic anhydride groups per molecular chain = 216 |
| Average number of ethylene groups in a row > 10,000 | Average number of ethylene groups in a row = one |
| Produced by reactive extrusion of polyethylene and cannot be produced in a high pressure reactor | Cannot be produced by reactive extrusion of polyethylene and can only be produced in a high pressure reactor |
| Insoluble in water at any temperature | Soluble in water, especially when heated |
| Crystalline | Non-Crystalline, amorphous |
| Melting point close to that of original polyethylene (125 to 140° C.) | No melting point. Softening point of 170° C., much higher than that of polyethylene |
| Cannot be dissolved in with alkali and converted to ionomer | Can be dissolved in with alkali and converted to ionomer |
| Is compatible with polyethylene | Is not compatible with polyethylene |
| Cannot be powdered at room temperature | Can be powdered at room temperature |

| Polyolefins Grafted with Maleic Anhydride | Alternating Olefin-Maleic Anhydride Copolymer |
|---|---|
| CANNOT be used to surface coat glass fibers in sizing emulsion CANNOT be used in nylon compounding to: increase melt viscosity and to reduce melt flow at low loading levels increase tensile strength and other mechanical properties at low loading levels improve resistance to anti-freeze upgrade properties of recycled nylon by compounding crosslink nylon at high loading levels at high loading | CAN be used to surface coat glass fibers in sizing emulsion CAN be used in nylon compounding to: increase melt viscosity and to reduce melt flow at low loading levels increase tensile strength and other mechanical properties at low loading levels improve resistance to anti-freeze upgrade recycled nylon by compounding crosslink nylon during compounding at high loading levels |

In any of the methods or compositions described herein, the olefin-maleic anhydride copolymer can have a weight average molecular weight ($MW_w$) in the range of about 1000 to about 900,000; about 20,000 to about 800,000; about 40,000 to about 600,000; about 50,000 to about 500,000; or about 60,000 to about 400,000. In any of the methods or compositions described herein, the 1:1 alternating olefin-maleic anhydride copolymer selected may be a 1:1 alternating copolymer of ethylene and maleic anhydride (1:1 EMA) with a weight average molecular weight ($MW_w$) of about 60,000 such as that sold under the trademark ZeMac® E-60 (Vertellus Specialties Inc., E60), or the 1:1 EMA selected may have a weight average molecular weight ($MW_w$) of about 400,000 such as that sold under the trademark ZeMac® E-400 (Vertellus Specialties Inc., E400).

As used herein, the term "compounding" generally refers to a process that mixes one or more polymers with one or more additives to produce plastic compounds in one or more steps. The materials to be mixed may be in the form of pellets, powders and/or liquids. Typically the product is in pellet form for use in other plastic-forming downstream processes such as extrusion and injection molding A polymer blend is formed when two polymers are mixed together to create a material with different properties than the two starting polymers. However most polymers are incompatible with one another and hence form many domains of immiscible phases which are rather large in size with almost no interfacial interaction between them. So most polymer blends have properties that are not what one would expect from an arithmetic addition of the properties from the fraction of each polymer property. A polymer alloy is the result when the interfacial adhesion between the two phases is improved sufficiently and the mixture of the two polymers shows synergistic properties such that you end up with improved property performance. This alloy of polymers may result because the two polymers are chemically compatible with one another or be the result of the use of a third component which acts to compatibilize the two immiscible polymers. In such a case, tiny domains of one polymer are formed in the matrix of the other polymer due to good adhesion at the interface between the two polymers. The formation of these dispersed domains results in improved properties compared to a blend of the two immiscible polymers. The third component used to compatibilize the otherwise two immiscible polymers is called a compatibilizer.

A composite is a blend of a polymer with a filler or reinforcing agent, which is used to enhance the properties of a polymer. Compatibilization of alloys, blends and composites requires intimate physical mixing and interfacial bonding or chemical compatibility. Compatibilization of composites enables them to have improved mechanical properties. How well the polymers and/or filler or reinforcement are compatiblized can be determined by morphology or by mechanical properties.

The olefin-maleic anhydride copolymer described herein is not a grafted copolymer with one or two maleic anhydride groups per molecular chain, but a true copolymer with multiple maleic anhydride groups in the main chain of the polymer. The olefin-maleic anhydride copolymers in the methods and compositions described herein have weight average molecular weights ($MW_w$) in the range of 1000 to 900,000. In one embodiment, the ethylene-maleic anhydride copolymers are 1:1 alternating copolymers. In one aspect, ethylene-maleic anhydride copolymers sold under the ZeMac® trademark can be used. It is believed that addition of olefin-maleic anhydride copolymers to polyesters enhances mechanical properties of the polyesters by increasing the melt viscosity and/or melt elasticity (i.e. chain extension of the polyester).

In any of the embodiments described herein, the olefin-maleic anhydride copolymer selected for reaction with a polyester and other engineering plastics and their alloys has a weight average molecular weight ($MW_w$) of in the range of about 1000 to about 900,000; about 20,000 to about 800,000; about 40,000 to about 600,000; about 50,000 to about 500,000; or about 60,000 to about 400,000. In any of the embodiments described herein, the 1:1 EMA may have a weight average molecular weight ($MW_w$) of about 60,000 such as that sold under the trademark ZeMac® E-60 (Vertellus Specialties Inc., E60), or the 1:1 EMA selected may have a weight average molecular weight ($MW_w$) of about 400,000 such as that sold under the trademark ZeMac® E-400 (Vertellus Specialties Inc., E400). Moreover, the EMA may be used in an exemplary embodiment of the method of producing compounded polyester at a concentration of between about 0.01% to about 10.0% w/w; about 0.02% to about 1.0%; about 0.05% to about 5.0% w/w; about 0.1% to about 5.0% w/w; or about 0.5% to about 2.0% w/w.

In another embodiment a master batch composition comprising an olefin-maleic anhydride copolymer and one or more additional additives in a matrix of a carrier resin is used. Some desired characteristics of a master batch include: the master batch improves the uniformity of the incorporation of the additives in the final composition, the additives do not phase separate from the carrier resin, the carrier resin does not phase separate with the polymer being formulated, the carrier resin remains thermally stable at the processing temperatures and under the processing conditions typically used for processing engineering plastics, and the presence of the carrier resin in the polymer formulation should not adversely affect the performance of the formulated composition. The choice of the carrier resin can be but not limited to polymers or their combination selected from polyacetal, polycarbonate, thermoplastic polyurethane (TPU), acrylonitrile-butadiene-styrene terpolymers (ABS) and polyester such as polylactic acid (PLA), a polyglycolic acid (PGA), a polycaprolactone (PCL), a polyethylene adipate (PEA), a polyhydroxyalkanoate (PHA), a polyhydroxybutyrate (PHB), a poly(3-hydroxybutyrate-co-3-hydroxyvalerate) (PHBV), a polyethylene terephthalate (PET), a polybutylene terephthalate (PBT), a polytrimethylene terephthalate (PTT).

METHODS AND EXAMPLES

General Testing Methods

Tensile, flexural, and Izod impact strength measurements were carried out using ASTM methods D-638, D-790, and D-256, respectively at 23° C. Melt flow rate (MFR) measurements were made following ASTM D-1238. Heat deflection/distortion temperatures (HDT) were measured using ASTM method D-648. These mechanical and thermal tests were carried out without additional drying. The samples were used as molded after conditioning the test specimen as described in the ASTM protocol. Water absorption tests were carried after drying to equilibration to ensure that all the absorbed water is between 0.01%-0.1% dryness levels.

Materials

A 1:1 ethylene-maleic anhydride alternating copolymer grade ZeMac® E60 (E60) from Vertellus Specialties Inc. with a weight average molecular weight ($MW_w$) of 60,000 was used in illustrative examples.

NLP™ clear grade of recycled polyethylene terephthalate (RPET) was obtained from Phoenix Technologies International. Recycled polybutylene terephthalate (RPBT), PBT325 NA EF grade and recycled 30% glass filled, GPB 130 NA EF grade was obtained from Lucent Polymers. Ingeo® Biopolymer 3251D grade of polylactic acid (PLA) was obtained from NatureWorks LLC.

Thermoplastic urethane (TPU) Pearlthane 11T93 (Shore A 93A) was obtained from Lubrizol. The thermoplastic urethane is a polycaprolactone co-polyester. Polybutylene terephthalate (PBT), Crastin 6131C was obtained from DuPont. Polycarbonate-Acrylonitrile butadiene styrene alloy (PC-ABS, Grade GP1-1001) was obtained from Polymer Resources Ltd.

General Compounding Preparation

Composite pellets of compounded recycled and virgin polyester with ZeMac® E60 were prepared in a co-rotating twin screw extruder (Coperion ZSK-30). Recycled PET compounding by itself or with E60 copolymer was conducted using temperature settings between 270-290° C. The recycled PBT and glass-filled PBT compounds were compounded with or without E60 using temperature settings between 230-260° C. The PLA, with or without E60 was processed at temperature settings between 190-210° C. Care was taken to ensure that all grades were used dry.

Composite pellets of compounded thermoplastic urethane (TPU) and its alloy polybutylene terephthalate (PBT) with and without ZeMac® E60 were prepared in a co-rotating twin screw extruder (Coperion ZSK-40). The compounding with and without ZeMac®E60 was processed at temperatures between 190-220° C. Care was taken to ensure that all grades were used dry.

Composite pellets of compounded alloy of polycarbonate-acrylonitrile butadiene styrene (PC-ABS) with and without ZeMac® E60 were prepared in a co-rotating twin screw extruder (Coperion ZSK-40). The compounding with and without ZeMac®E60 was processed at temperatures between 240-255° C. Care was taken to ensure that all grades were used dry.

Preparation of Compounds of Ethylene-Maleic Anhydride Compositions with Polyesters:

The formulation used for producing compounds of polyester with olefin-maleic anhydride copolymers is shown in TABLE 1:

TABLE 1

| Examples | Recycled PET | Recycled PBT | Recycled 30% glass filled PBT | PLA | ZeMac® E60 |
|---|---|---|---|---|---|
| F1 | 100 | | | | |
| F2 | 99.5 | | | | 0.5 |
| F3 | | 100 | | | |
| F4 | | 99.5 | | | 0.5 |
| F5 | | 99 | | | 1.0 |
| F6 | | | 100 | | |
| F7 | | | 99.65 | | 0.35 |
| F8 | | | 99.31 | | 0.69 |
| F9 | 80 | 20 | | | |
| F10 | 79.5 | 20 | | | 0.5 |
| F11 | | | | 100 | |
| F12 | | | | 99.5 | 0.5 |

Compounding of Olefin-Maleic Anhydride Compositions with Recycled Pet:

Table 2 shows the mechanical properties of recycled PET compounded by itself and with E60 copolymer at 0.5%. The lowering in MFR with olefin-maleic anhydride copolymer result demonstrates that molecular weight of the PET is increasing which is then complimented by increase in flexural modulus and heat deflection temperature.

TABLE 2

| Examples | Materials | FLEXURAL MODULUS ASTM D790 (MPa) | HDT ASTM D648 @ 66 psi (° C.) | HDT ASTM D648 @ 264 psi (° C.) | MFR ASTM D1238 @ 265° C. w/2.16 kg (g/10 min) |
|---|---|---|---|---|---|
| F1 | Control | 2722.3 | 69.0 | 59.9 | 133.69 |
| F2 | RPET/E60P | 2792.5 | 69.8 | 62.2 | 101.00 |

Compounding of Olefin-Maleic Anhydride Compositions with Recycled PBT and Glass-Filled PBT:

Table 3 shows the results of mechanical properties of recycled PBT compounded by itself and with E60 copolymer. Similar to the results of recycled PET, the recycled PBT compounds with E60 show increased flexural modulus and HDT because of increase in molecular weight as evident by lower MFR results.

TABLE 3

| Examples | Materials | FLEXURAL MODULUS ASTM D790 (MPa) | HDT ASTM D648 @ 66 psi (° C.) | HDT ASTM D648 @ 264 psi (° C.) | MFR ASTM D1238 @ 250° C. w/2.16 kg (g/10 min) |
|---|---|---|---|---|---|
| F3 | Control | 2899.7 | 132.3 | 57.6 | 24.88 |
| F4 | RPBT/E60 | 2931.2 | 142.5 | 60.3 | 22.85 |
| F5 | RPBT/E60 | 3012.7 | 148.9 | 59.8 | 22.47 |

Table 4 shows 30% glass-filled recycled PBT compounded by itself and the mechanical properties are compared to 0.35% (example F7) and 0.69% (example F8) which is equivalent to 0.5% and 1.0% E60 equivalent by weight of the polymer. In both the E60 composites with recycled glass-filled PBT the resulting composite shows in enhancement of all the mechanical properties with the exception of HDT in example F7. The improvement in mechanical properties is accompanied by lowered MFR indicating an increased molecular weight.

TABLE 4

| Examples | Materials | TENSILE STRENGTH ASTM D638 @ Yield (MPa) | FLEXURAL MODULUS ASTM D790 (MPa) | IZODIMPACT STRENGTH ASTM D256 @ Room Temp (ft-lb/in) | HDT ASTM D648 @ 66 psi (° C.) | HDT ASTM D648 @ 264 psi (° C.) | MFR ASTM D1238 @ 250° C. w/2.16 kg (g/10 min) |
|---|---|---|---|---|---|---|---|
| F6 | Control w/GF | 80.92 | 6153.6 | 0.98 | 215.4 | 182.3 | 26.17 |
| F7 | RPBT/E60 w/GF | 84.29 | 6177.6 | 1.06 | 213.4 | 181.4 | 24.34 |
| F8 | RPBT/E60 w/GF | 86.07 | 6373.0 | 1.03 | 216.7 | 186.0 | 23.90 |

It is believed that in addition to increased molecular weight, addition of the olefin-maleic anhydride copolymer also enhances the interaction of the glass-fiber with that of recycled PBT resin.

Compounding of Olefin Maleic Anhydride Compositions with PLA:

Table 5 shows mechanical property of PLA, a biopolymer polyester, whose commercial uses have grown especially for film extrusion, injection molding, blow molding, profile and sheet extrusion.

TABLE 5

| FORMULATION | MATERIALS | TENSILE STRENGTH ASTM D638 @ Yield (MPa) | FLEXURAL MODULUS ASTM D790 (MPa) | IZOD IMPACT STRENGTH ASTM D256 @ Room Temp (ft-lb/in) | MFR ASTM D1238 @ 190° C. w/2.16 kg (g/10 min) |
|---|---|---|---|---|---|
| F9 | PLA Control | 66.60 | 3873.6 | 0.53 | 29.52 |
| F10 | PLA with E60 | 67.17 | 4352.1 | 0.53 | 30.88 |

The results in Table 5 show an increase in tensile and flex modulus when PLA is compounded with E60 without affecting the impact strength of the polyester. Unlike other examples described, the MFR of PLA is not reduced by addition of E60 to the polyester.

Alloyed Compositions of Polyesters Using Olefin-Maleic Anhydride Copolymers:

It is known to one skilled in the art that alloying of two different classes of polyesters, both being compatible materials is useful for achieving polymer mixtures with balance of properties. However, it is very desirable to have such compositions with improved properties. An illustrative example of an alloy of interest is PET with PBT. PET is known to have long cycle times during molding and PBT is typically mixed in PET to ensure fast crystallization and improved impact strength. A PET/PBT alloy of commercial interest is 20% PBT in a PET matrix. It would be very desirable to alloy recycled PET with recycled PBT and to enhance the mechanical property of such alloy.

TABLE 6

| EXAMPLES | MATERIALS | TENSILE STRENGTH ASTM D638 @ Yield (MPa) | FLEXURAL MODULUS ASTM D790 (MPa) | IZOD IMPACT STRENGTH ASTM D256 @ Room Temp (ft-lb/in) | HDT ASTM D648 @ 66 psi (° C.) | HDT ASTM D648 @ 264 psi (° C.) | MFR ASTM D1238 @ 265° C. w/2.16 kg (g/10 min) |
|---|---|---|---|---|---|---|---|
| F11 | RPET/RPBT | 50.51 | 2471.2 | 0.49 | 62.6 | 57.9 | 61.49 |
| F12 | RPET/RPBT with E60 | 53.25 | 2556.5 | 0.51 | 62.8 | 57.4 | 38.66 |

TABLE 6 demonstrates the results of mechanical properties of recycled PET/PBT alloy by itself and with the olefin-maleic anhydride copolymer. The results show that adding E60 copolymer improves the mechanical properties of the alloy resulting in a very tough alloyed compound as demonstrated in Example F12.

The compositions and method described here can be used for improving the properties of engineering plastics and enabling the alloying of polyesters with non-compatible engineering plastics. These concepts are demonstrated in the formulations shown in TABLE 7.

TABLE 7

| Examples | TPU | PBT | Nylon-6 | ZeMac ® E60 |
|---|---|---|---|---|
| F13 | 100 | | | |
| F14 | 99.0 | | | 1.0 |
| F15 | | 100 | | |
| F16 | 25 | 75 | | |
| F17 | 25 | 74 | | 1.0 |
| F18 | | | 100 | |
| F19 | | 25 | 75 | |
| F20 | | 25 | 75 | 0.5 |

The results of the formulation in Table 7 are shown in Table 8.

TABLE 8

| FORMULATION | MATERIALS | TENSILE STRENGTH @ Yield ASTM D638 (MPa) | TENSILE STRAIN @ BREAK ASTM D638 (%) | FLEXURAL MODULUS ASTM D790 (MPa) | IZOD IMPACT STRENGTH @ 23° C. ASTM D256 (ft-lb/in) |
|---|---|---|---|---|---|
| F13 | TPU-Control | 16.1 | 437.0 | 118.6 | 6.58 |
| F14 | TPU with E60 | 21.4 | 552.1 | 131.9 | 6.90 |
| F15 | PBT-Control | 55.0 | 4.0 | 2616.7 | 0.48 |
| F16 | PBT-TPU-25 | 15.0 | 2.0 | 1353.3 | 0.56 |
| F17 | PBT-TPU-25 with E60 | 32.0 | 35.3 | 1411.1 | 2.35 |
| F18 | Nylon-6-Control | 70.3 | 18.3 | 2755.4 | 0.72 |
| F19 | Nylon-6-PBT | 56.5 | 3.2 | 2532.6 | 0.39 |
| F20 | Nylon-6-PBT with E60 | 63.5 | 4.3 | 2540.3 | 0.37 |

The example F14 shows highly improved mechanical properties of TPU in the presence of ZeMac® E-60 when compared to its control in example F13.

Example F16 and F19 shows very poor mechanical properties when polyester is alloyed with non-compatible TPU and Nylon engineering plastics; however examples F17 and F20 shows highly improved mechanical properties of both the alloys in presence of ZeMac® E-60 demonstrating that ZeMac® E-60 is working as a compatibilizer between two non-compatible engineering plastic matrix.

Preparation of Compounds of Ethylene-Maleic Anhydride Copolymer Compositions with Polycarbonate-Acrylonitrile Butadiene Styrene Alloy:

The formulation used for producing compounds of Polycarbonate-acrylonitrile butadiene styrene (PC-ABS) alloy with olefin-maleic anhydride copolymers is shown in TABLE 9.

TABLE 9

| Examples | PC-ABS | ZeMac ® E60 |
|---|---|---|
| F21-Control | 100 | |
| F22 | 99.5 | 0.5 |
| F23 | 99.0 | 1.0 |

Example F21 representing control samples of PC-ABS alloys are well known to one skilled in the art. The mechanical properties of PC-ABS with olefin-maleic anhydride copolymers are shown in Table 10.

TABLE 10

| Formulation | Materials | TENSILE STRENGTH ASTM D638 @ Yield (MPa) | TENSILE STRAIN ASTM D638 @ BREAK (%) | FLEXURAL MODULUS ASTM D790 (MPa) | IZOD IMPACT STRENGTH ASTM D256 @ Room Temp (ft-lb/in) |
|---|---|---|---|---|---|
| F21 | PC-ABS Control | 56.5 | 39.9 | 2049.3 | 11.7 |
| F22 | PC-ABS with E60 | 59.1 | 51.0 | 2306.5 | 12.7 |
| F23 | PC-ABS with higher E60 | 59.4 | 67.7 | 2413.4 | 12.7 |

Example F22 and F23 demonstrates that ZeMac® E-60 improves all the mechanical properties of alloyed PC-ABS of Example F21.

Preparation of Articles Produced from Compositions Described Herein

The compositions described herein can be formed into articles using methods known to those skilled in the art, such as, injection molding, blow molding, extrusion, and the like.

It will be appreciated by those skilled in the art of compounding polyesters, that changes can be made to the embodiments described above without departing from the broad inventive concept. It is understood, therefore that this disclosure is not limited to a particular embodiment disclosed, but it is intended to cover modifications that are within the scope of the disclosure. While, the methods used to make articles using the compositions have been described herein, the embodiments are merely offering by way of non-limiting examples of the disclosure described herein. Many variations and modifications of the embodiments described herein will be apparent in light of the disclosure. It is therefore to be understood that changes and modifications may be made by one of skill in the art, and equivalents may be substituted for elements thereof, without departing from the scope of the disclosure.

What is claimed is:

1. A thermoplastic pelletizable compatibilized polymer alloy composition comprising:
   (a) thermoplastic polyurethane (TPU) and polybutylene terephthalate (PBT) or polyamide and polybutylene terephthalate (PBT); and
   (b) an olefin-maleic anhydride copolymer,
      wherein the olefin-maleic anhydride copolymer enables compatibilization of the non-compatible engineering plastics,
      wherein the olefin-maleic anhydride copolymer is a 1:1 alternating copolymer of maleic anhydride and an olefin, and
      wherein the concentration of the olefin-maleic anhydride is about 0.5 to about 2% of the composition.

2. The thermoplastic pelletizable compatibilized polymer alloy composition of claim 1, wherein (a) is thermoplastic polyurethane (TPU) and polybutylene terephthalate (PBT).

3. The thermoplastic pelletizable compatibilized polymer alloy composition of claim 1, wherein (a) is polyamide and polybutylene terephthalate (PBT).

4. The thermoplastic pelletizable compatibilized polymer alloy composition of claim 1, wherein the olefin-maleic anhydride copolymer is an ethylene-maleic anhydride copolymer.

5. The thermoplastic pelletizable compatibilized polymer alloy composition of claim 1, wherein the olefin is selected from the group consisting of ethylene, propylene, isobutylene, 1-butene, octene, butadiene, styrene, isoprene, hexene, dodecene, 1-dodecene and tetradecene.

6. The thermoplastic pelletizable compatibilized polymer alloy composition of claim 1, wherein the olefin-maleic anhydride copolymer has a weight average molecular weight of ($MW_w$) of about 40,000 to about 600,000.

7. The thermoplastic pelletizable compatibilized polymer alloy composition of claim 6, wherein the olefin is ethylene.

8. The thermoplastic pelletizable compatibilized polymer alloy composition of claim 1, wherein the concentration of the olefin-maleic anhydride is about 0.5 to about 1.5% of the composition.

9. The thermoplastic pelletizable compatibilized polymer alloy composition of claim 8, wherein the olefin is ethylene.

10. The thermoplastic pelletizable compatibilized polymer alloy composition of claim 2, wherein the olefin is ethylene.

11. The thermoplastic pelletizable compatibilized polymer alloy composition of claim 10, wherein the olefin-maleic anhydride copolymer has a weight average molecular weight of ($MW_w$) of about 40,000 to about 600,000.

12. The thermoplastic pelletizable compatibilized polymer alloy composition of claim 11, wherein the concentration of the olefin-maleic anhydride is about 0.5 to about 1.5% of the composition.

* * * * *